United States Patent [19]

Eck et al.

[11] 4,330,006
[45] May 18, 1982

[54] DAMPING DEVICE FOR CHECK VALVES

[75] Inventors: Werner Eck, Herzogenaurach; Jürgen Hoffmann, Erlangen, both of Fed. Rep. of Germany

[73] Assignee: Kraftwerk Union Aktiengesellschaft, Mulheim an der Ruhr, Fed. Rep. of Germany

[21] Appl. No.: 177,711

[22] Filed: Aug. 13, 1980

[30] Foreign Application Priority Data

Aug. 16, 1979 [DE] Fed. Rep. of Germany ....... 2933265

[51] Int. Cl.³ .................... F16K 15/03; F16K 47/00
[52] U.S. Cl. .................................. 137/514; 137/527
[58] Field of Search ............... 137/514, 514.3, 514.5, 137/514.7, 527, 527.2, 527.4, 527.6, 527.8; 251/48

[56] References Cited

U.S. PATENT DOCUMENTS 2,717,001 9/1955 Perrault ............................... 137/514
3,098,502 7/1963 Deve ..................................... 137/514

FOREIGN PATENT DOCUMENTS 2736080 2/1979 Fed. Rep. of Germany .

*Primary Examiner*—William R. Cline
*Attorney, Agent, or Firm*—Herbert L. Lerner; Laurence A. Greenberg

[57] ABSTRACT

Damping device for a check valve with a closure member movable by fluid flow, including means defining a chamber, a piston mounted and longitudinally movable in the chamber, a plunger connected to and movable with the piston, the plunger being engageable with a stop just before the closure member reaches a valve closing position thereof and thereby moving the piston in the chamber, the chamber being closed on all sides thereof and filled with fluid, the chamber having a cross section increasing in direction toward the closure member, and spring means for exerting a force on the plunger and the piston in direction towards the closure member.

3 Claims, 2 Drawing Figures

4,330,006

DAMPING DEVICE FOR CHECK VALVES

BACKGROUND OF THE INVENTION

The invention relates to a damping device for a check valve with a closure member movable by fluid flow, a piston movable in longitudinal direction in a chamber, and a plunger connected thereto and arranged so that it strikes a stop shortly before the closure member reaches a closing position thereof, the piston being thereby moved in the chamber.

Such an arrangement is described in German Published Non-prosecuted Application (DE-OS) No. 27 36 080. In this heretofore known check valve, the closure member strikes a stop which is connected to a ring piston, shortly before the closure member reaches the closing position thereof. The ring piston moves in a hollow cylinder which has throttle openings communicating with the interior of the pipeline. Thereby, a progressive damping of the closure member shortly before it reaches the closing position thereof is achieved.

It is an object of the invention to provide a damping device for a check valve of this general type which is of simpler construction than the heretofore known devices for such a valve and can therefore be made even more operationally reliable at less expense. In addition, it is an object of the invention to provide such a device wherein the space for the damping fluid can be closed off completely from the interior of the pipeline so that there is less danger of soiling the damping device, and the damping device can also be used for check valves in gas-carrying lines.

SUMMARY OF THE INVENTION

With the foregoing and other objects in view, there is provided, in accordance with the invention, a damping device for a check valve with a closure member movable by fluid flow, comprising means defining a chamber, a piston mounted and longitudinally movable in the chamber, a plunger connected to and movable with the piston, the plunger being engageable with a stop just before the closure member reaches a valve closing position thereof and thereby moving the piston in the chamber, the chamber being closed on all sides thereof and filled with fluid, the chamber having a cross section increasing in direction towards the closure member, and spring means for exerting a force on the plunger and the piston in direction towards the closure member.

In accordance with a concomitant feature of the invention, the damping device is mounted with the closure member in a pipeline, the stop being disposed in the pipeline apart from the closure member, the damping device inclusive of the plunger and the piston being built into the closure member.

Other features which are considered as characteristic for the invention are set forth in the appended claims.

Although the invention is illustrated and described herein as embodied in a damping device for check valves, it is nevertheless not intended to be limited to the details shown, since various modifications and structural changes may be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying drawings, in which.

DESCRIPTION OF THE PREFERRED EMBODIMENTS

Figure 1:
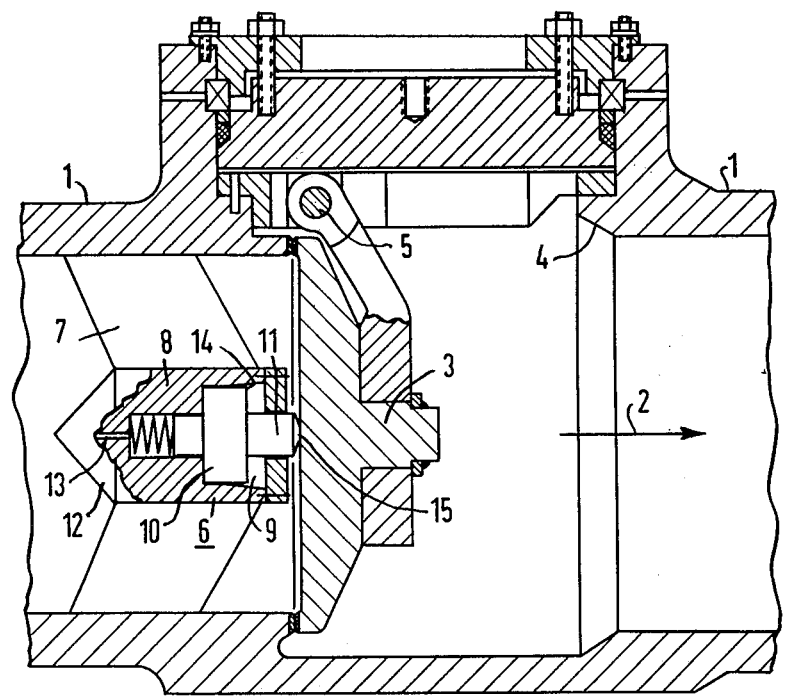
FIGS. 1 and 2 are longitudinal sectional views of different embodiments of the damping device for check valves constructed in accordance with the invention.
Figure 2:
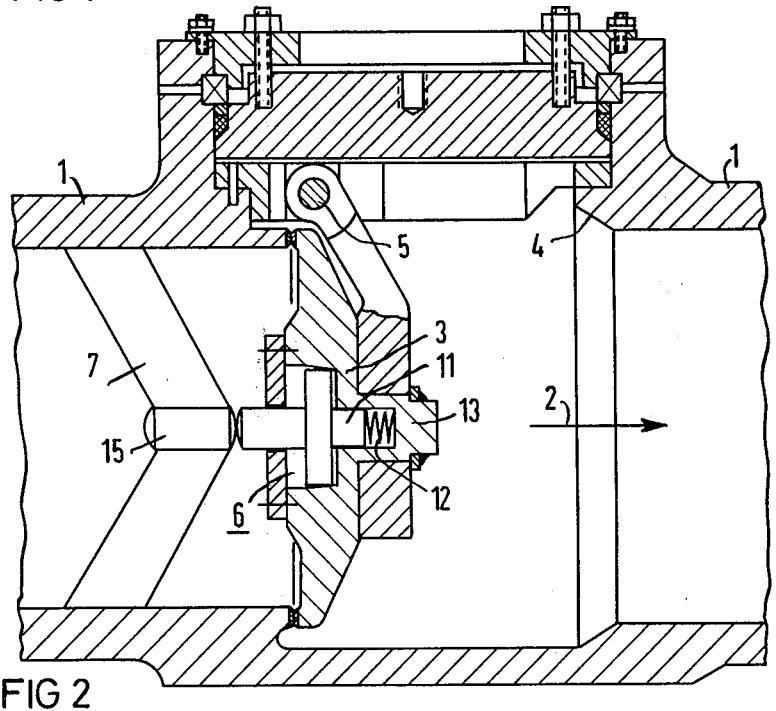

In FIG. 1, the damping device 6 is held in the middle of a pipeline 1, and the check-valve closure member 3 acts as a stop in FIG. 2, a stop 15 is provided in the middle of the pipe and the damping device 6 is in the closure member 3.

In FIG. 1 the pipeline 1 is shown conventionally traversed by a liquid or a gas in direction of the arrow 2. With this direction of flow, the closure member 3 would be opened and would engage the edge 4 of the pipeline 1. When the flow is reversed, the closure member 3 swings into the illustrated position thereof by turning about the shaft 5. The damping device 6 is held in the middle of the pipeline 1 by means of arms 7 and is formed of a cylindrical body 8 having a chamber 9 therewithin which is closed off from the outside. A piston 10 is mounted for movement in longitudinal direction within the chamber 9. To this end, the piston 10 is connected to a plunger 11 which is supported on both sides of the piston 10 in the cylindrical body 8.

The piston 10 is forced in the direction of the closure member 3 by a spring 12 which is braced, on the one hand, against the cylindrical body 8 and, on the other hand, against the plunger 11. The cavity in which the spring 12 is received is connected to the interior of the pipeline through a bore 13 formed in the cylindrical body. This bore 13 can also communicate with the chamber 9, however. In the embodiment of FIG. 1, the chamber 9 is substantially cylindrical but has a diameter which increases in the direction toward the closure member 3. A gap 14 is thereby formed between the piston 10 and the cylindrical body 8, through which the liquid contained in the chamber 9 must squeeze when the piston 10 moves. The effective cross section of the gap 14 between the piston 10 and the cylindrical body 8 depends upon the position of the piston 10, so that the progressivity of the damping device can be selected by appropriate construction of this gap 14. Instead of a cylindrical construction of the chamber 9, other cross sections can also be provided; for example, slots formed in the body 8 could assume the function of the gap 14.

In the drawing, like parts in FIGS. 1 and 2 are provided with the same reference characters. In the embodiment of FIG. 2 a stop is held in the center of the pipeline 1 by means of straps or arms 7 and the damping device 6 is built into the closing member 3. The plunger 11, therefore, moves with the closure member 3 in direction toward the stop 15 and strikes the latter shortly before reaching the closing position. The operation of the embodiment of FIG. 2 is the same as of the embodiment of FIG. 1.

There are claimed:

1. Damping device for a check valve in liquid lines having a closure member movable by liquid flow and disposed on a flap seat in closed condition of the valve, and a damping unit with throttling surfaces separated from respective surfaces of the flap seat, the damping unit including a pair of opposing damping elements in the form of a cylinder and a piston with a piston plunger, on the one hand, and a stop for the piston plunger, on the other hand, one of the damping elements being connected to the closure member, and the other of the damping elements being connected to the flap seat, the cylinder being formed with a chamber wherein the piston with the piston plunger is longitudinally movably mounted so that the piston plunger extends out of the chamber and is engageably with the stop just before the closure member reaches the position thereof in which the valve is in the closed condition thereof, thereby moving the piston within the cylinder chamber, the chamber being closed nearly on all sides thereof and being filled with liquid, and a restoring spring disposed between the piston and a base location of the cylinder so as to exert a force on the piston plunger in direction toward the closure member, comprising arm means for holding the damping element connected with the flap seat centrally within the interior of a liquid line, the cylinder chamber having a cross section increasing toward the side thereof facing toward the stop.

2. Damping device according to claim 1 wherein the damping element connected with the flap seat is the damping cylinder with the piston and the piston plunger, and the stop is seated at the closure member.

3. Damping device according to claim 1 wherein the damping element connected with the flap seat is the stop for the piston plunger, and the other damping element with the piston and the piston plunger being built into the closure member formed with the respective cylinder chamber.

* * * * *